United States Patent
Kagehiro et al.

(10) Patent No.: US 7,190,833 B2
(45) Date of Patent: Mar. 13, 2007

(54) MOBILE DEVICE AND TRANSMISSION SYSTEM

(75) Inventors: Tatsuhiko Kagehiro, Kokubunji (JP); Minenobu Seki, Kokubunji (JP); Hiroshi Sako, Shiki (JP)

(73) Assignee: Hitachi, Ltd., Tokyo (JP)

( * ) Notice: Subject to any disclaimer, the term of this patent is extended or adjusted under 35 U.S.C. 154(b) by 677 days.

(21) Appl. No.: 10/200,286

(22) Filed: Jul. 23, 2002

(65) Prior Publication Data

US 2003/0044068 A1 Mar. 6, 2003

(30) Foreign Application Priority Data

Sep. 5, 2001 (JP) .......................... P2001-268194

(51) Int. Cl.
*G06K 9/34* (2006.01)
(52) U.S. Cl. ...................... 382/176; 382/177; 382/198; 382/229; 382/282; 382/313
(58) Field of Classification Search ................ 382/176, 382/177, 198, 229, 282, 301, 313; 455/566; 358/473
See application file for complete search history.

(56) References Cited

U.S. PATENT DOCUMENTS

| | | | |
|---|---|---|---|
| 6,427,078 B1 * | 7/2002 | Wilska et al. ............ | 455/550.1 |
| 6,501,565 B1 * | 12/2002 | Karidi et al. ................ | 358/1.9 |
| 6,594,503 B1 * | 7/2003 | Herzig et al. ............ | 455/550.1 |
| 6,752,317 B2 * | 6/2004 | Dymetman et al. ..... | 235/462.45 |
| 6,883,000 B1 * | 4/2005 | Gropper ...................... | 707/10 |
| 2002/0058536 A1 * | 5/2002 | Horii et al. ................. | 455/566 |

FOREIGN PATENT DOCUMENTS

| | | |
|---|---|---|
| JP | 02-059880 | 8/1988 |
| JP | 02-274173 | 4/1989 |
| JP | 03-168888 | 11/1989 |
| JP | 06-223224 | 1/1993 |
| JP | 10-254622 | 3/1997 |
| JP | 2000-023012 | 7/1998 |
| JP | 2000-207338 | 1/1999 |
| JP | 2000-331006 | 5/1999 |

OTHER PUBLICATIONS

Bouton et al., Inside Adobe Photoshop 5, May 1998, New Riders, pp. 215-216.*

* cited by examiner

*Primary Examiner*—Jingge Wu
*Assistant Examiner*—John Strege
(74) *Attorney, Agent, or Firm*—Reed Smith LLP; Stanley P. Fisher, Esq.; Juan Carlos A. Marquez, Esq.

(57) ABSTRACT

The invention relates to a mobile device with a built-in image capture device, and a character recognition function to present the information gathered with the character recognition result. With the mobile device, the character line extraction process is displayed whenever necessary, and the resolution of an image to be inputted for recognition processing is enhanced. Accordingly, it is possible for the operator to select the target character line with ease. In addition, the mobile device has a character recognition ratio improved by the enhancement in resolution.

20 Claims, 9 Drawing Sheets

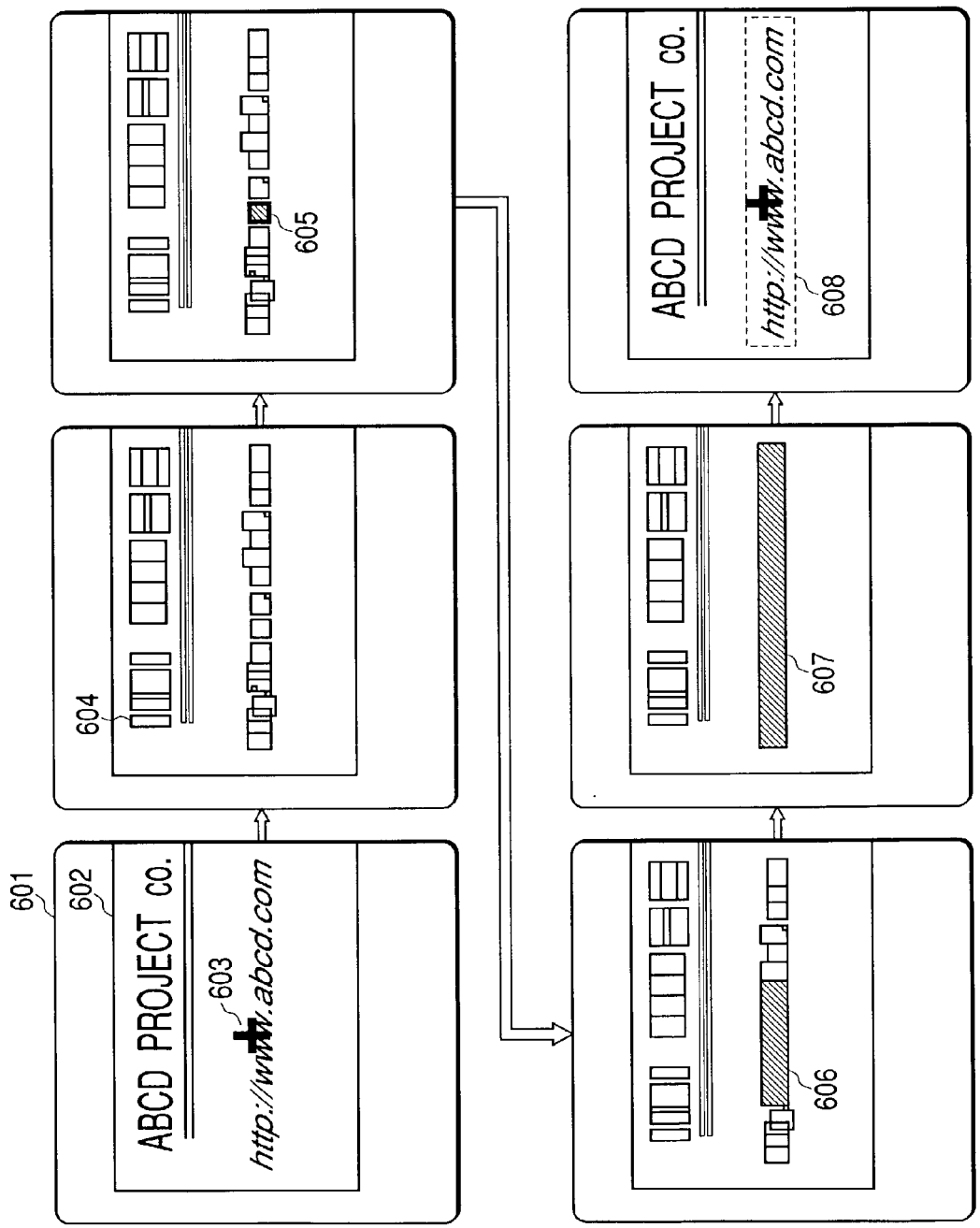

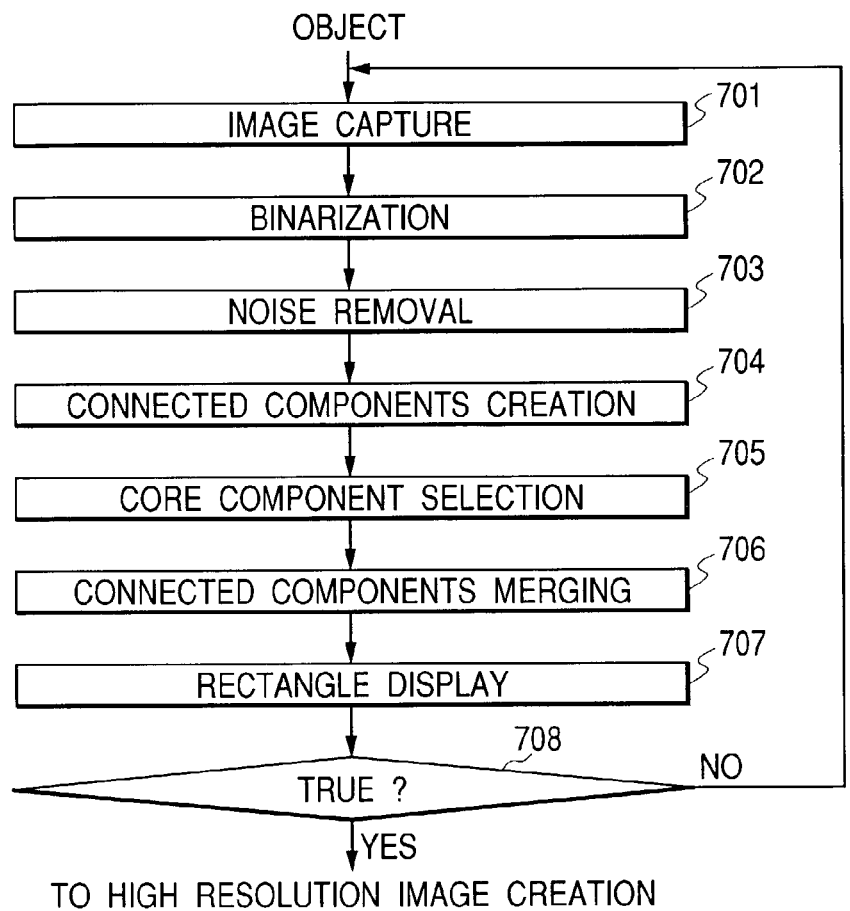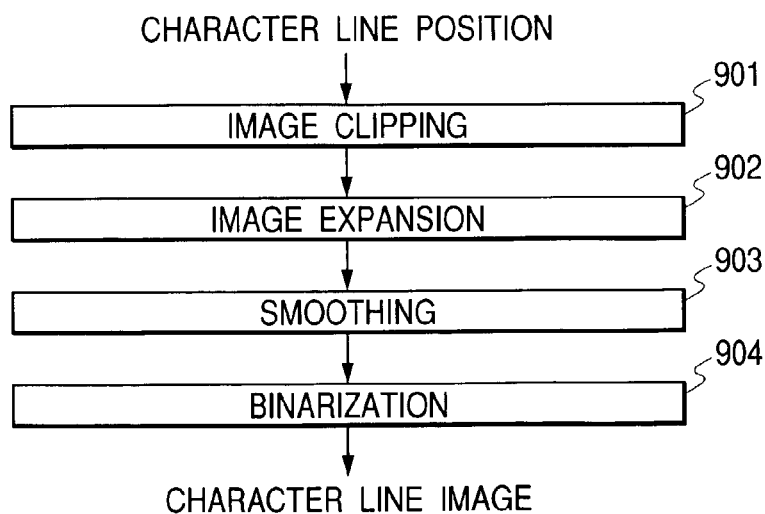

MOBILE DEVICE AND TRANSMISSION SYSTEM

FIELD OF THE INVENTION

A mobile device, such as a mobile phone, with a built-in image capture device is widespread due to the increase in CPU performance, and the price reduction of a CCD or the like. By capturing an image including a character string noted by a user, and recognizing the character string using the mobile device with a built-in image capture device, it becomes possible to extract the information related to the character string from a network. In order to select the target character string from the image, an instruction method, which uses a simple user interface on the mobile device to be intuitively operated, is demanded.

There is always a trade off between the resolution and the recognition ratio. When a high recognition ratio is required, the input image is required to be processed. It is difficult for the mobile device to capture a high resolution image, in terms of the structure. For this reason, the character recognition is performed using a low resolution image captured by the camera of the mobile device.

BACKGROUND OF THE INVENTION

The information retrieval techniques using the character recognition results from the image are described in JP-A-331006/2000 and JP-A-254622/1998. Whereas, JP-A-23012/2000 describes a translator using a mobile device. In this invention, a line segment for applying the target character line to the graphic user interface (GUI) is displayed on an image display. However, the line segment is fixed in length and position, and it is used only as an index for an operator to capture the image, so that the operator is required to adjust the position and the size of the character line. This prior art reference fails to disclose any character recognition for the image captured by a low resolution image capture device in the mobile device.

JP-A-23012/2000 describes a means, which includes a CCD camera in a mobile telephone or a mobile device to capture an image so as to perform character recognition, and it has a translation function for translating between languages and a retrieval function for retrieving into based on the translation results. However, it does not provide any means for an operator to easily select the target character line out of the image. In contrast, in accordance with the present invention, the character line extraction result from the input image is presented for the operator whenever necessary. This enables easy confirmation of a target character line.

Further, an image capture device to be included in a mobile device or the like is difficult to design to be capable of capturing a high resolution image while balancing the cost and the size. If recognition processing is performed with a low resolution image, the recognition ratio is adversely affected which may inhibit the intended purpose of the operator. Under such circumstances, in accordance with the present invention, the extraction processing of the character line is performed from the captured low resolution image, and then the image of the character line is subjected to an expansion processing. As a result, the resolution of the character line image is enhanced to improve the recognition ratio.

SUMMARY OF THE INVENTION

It is an object of the present invention to provide a mobile device which has a means for extracting the character line embedded area in a captured image, wherein the character line embedded areas are continuously extracted while the captured images change, and the extracted character line embedded areas are displayed on a display means accordingly until an input is made to a confirming means. The invention further has a means for confirming the character line embedded area is to be processed for recognition, a means for transmitting the recognition result via a network, and a means for receiving feedback via the network based on the recognition result.

Another object of the invention is to provide the mobile device which further has a resolution enhancing means of the captured image, wherein the confirmed character line embedded area is subjected to pixel complementing, smoothing, and binarizing.

Still other object of the invention is to provide a transmission system having the mobile device, and a computer connected to the mobile device via a network, wherein the mobile device has a means for transmitting the recognition result or the character line extraction area acquired on the mobile device to the computer via the network, and the computer has a means for performing an information search through the network based on the transmitted recognition result or the character line extraction area, and for transmitting the search result to the mobile device.

BRIEF DESCRIPTION OF THE DRAWINGS

The foregoing and additional features and characteristics of the present invention will become more apparent from the following detailed description considered with reference to the accompanying drawings in which like reference numerals designate like elements and wherein:

FIG. 6 is a conceptual diagram of character line extraction;

FIG. 7 is a flow chart of character line extraction;

FIG. 9 is a flow chart of high resolution image creation;

DETAILED DESCRIPTION OF THE PREFERRED EMBODIMENTS

The present invention is embedded in detail by reference to the appended drawings as follows.

Figure 1:
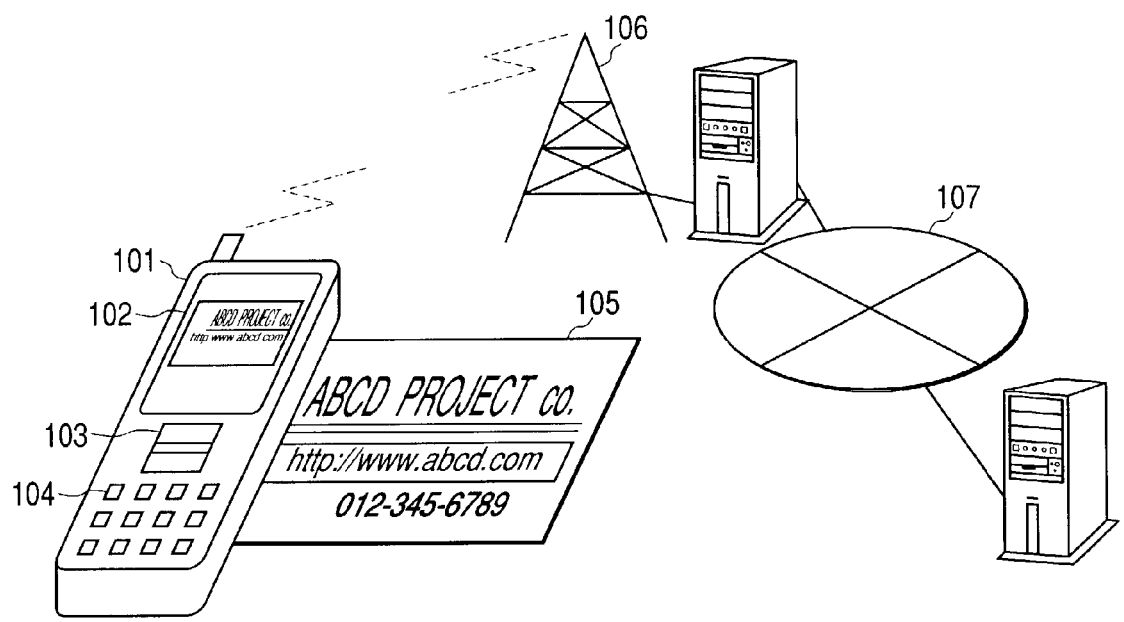
FIG. 1 is a diagram of information gathering using a mobile device with a recognition function.

FIG. 1 shows a mobile device to be used in the present invention, and an image of an object with a character line serving as input data. A reference numeral 101 denotes one example of the mobile device. A reference numeral 102 denotes a content display on the mobile device 101. Whereas, a camera is applied as an image capture device on the side opposite to the display. A reference numeral 103 denotes a control lever, and 104 denotes buttons. The content display is a touch panel, through which an operator can directly provide instructions. By using this mobile device, the URL address and the character line image on the object as denoted by a reference numeral 105 are captured. Then, the character line embedded area extraction and the character line recognition are performed. Then the data is transmitted through wireless communication as denoted by a reference numeral 106. By using computers connected to a network as denoted by a reference numeral 107, the information related to the recognized contents on the network are searched, transmitted, and displayed. The operator sees the displayed contents, and provides instructions again. Thus, relevant information is retrieved.

Figure 2:
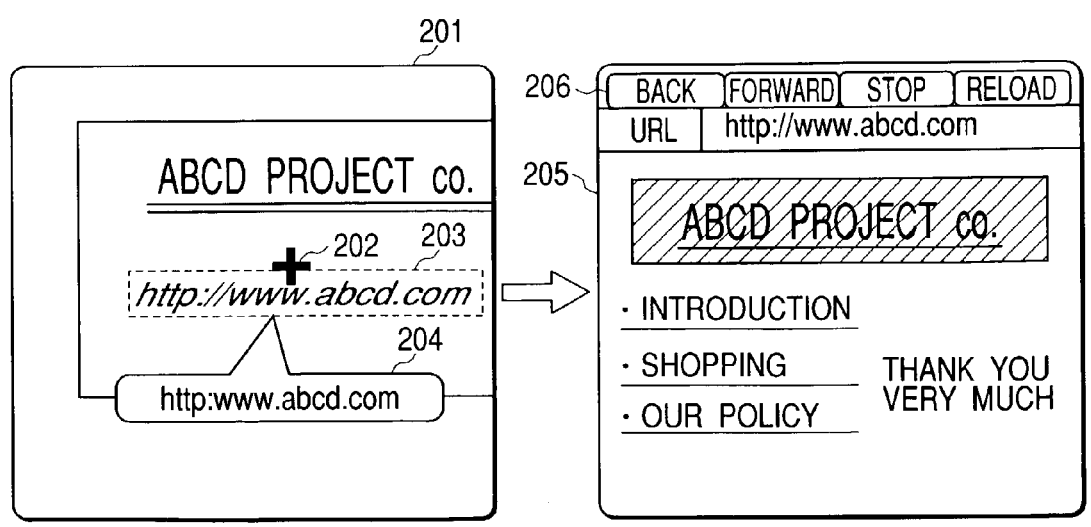
FIG. 2 is a diagram showing the displayed contents of a mobile device in accordance with the present invention.
Figure 3:
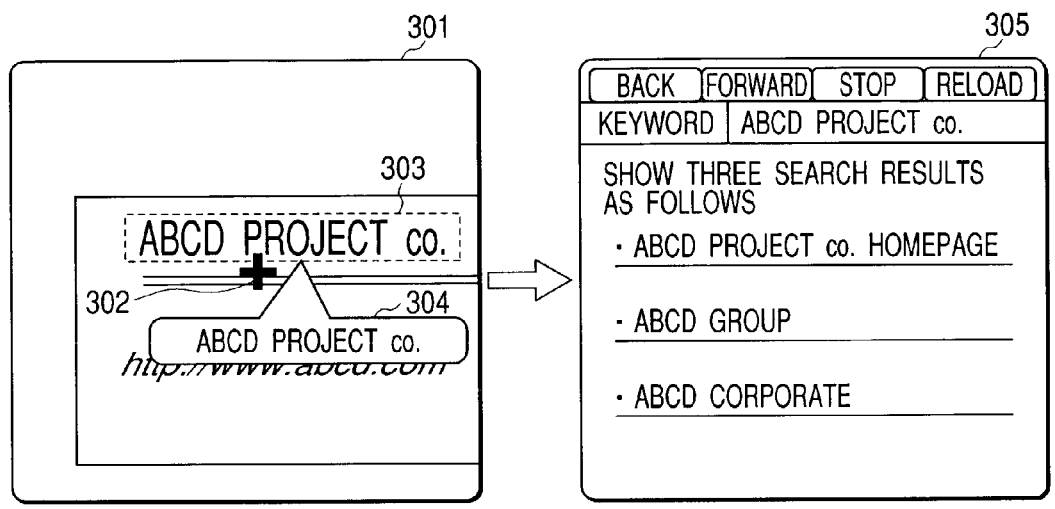
FIG. 3 is a diagram showing other displayed contents of the mobile device in accordance with the present invention.

FIGS. 2 and 3 show the content display examples of the present invention.

FIG. 2 shows an example in which the character recognition processing has been performed on the URL character line embedded in a captured object image, and the homepage corresponding to the URL has been retrieved based upon the recognition results. First, the object captured by an image capture device is displayed on a content display denoted by a reference numeral 201. A marker is displayed as denoted by 202 in the content display. The marker is movable by an operator. The character line rectangle extraction processing is performed on the URL character line located closest to the marker. The rectangle strip (in broken lines) resulting from the extraction as denoted by 203 is reloaded whenever necessary, and the reloaded rectangle strip is repeatedly displayed. As a result, the operator can select the recognition target character line with ease by operating the device, or shifting the marker. When the resulting rectangle outline properly encloses the target character line, the user inputs a confirmation instruction to perform the character recognition on the character line within the rectangle strip. Thereafter, the recognition result is displayed in a pop-up window as denoted by 204. If the recognition result is proper, the operator inputs a confirmation instruction. As a result, as shown in the diagram denoted by 205, the contents available at the URL corresponding to the recognition result are transmitted from the computer on a network to the mobile device. Thereafter, the operator sees the contents on the display, and selects the icons on the display as denoted by 206. Thus, relevant information is retrieved.

FIG. 3 shows an example in which the character recognition processing has been performed on the character line on a captured object, and the contents on a network have been searched based on the recognition results to be displayed on the mobile device. In the same manner as in FIG. 2, the captured contents are displayed on a display denoted by 301. This time, a character line closest to a marker denoted by 302 is extracted. A user inputs a confirmation instruction with respect to a character line rectangle strip out of the successively displayed character line rectangle stripes as denoted by 303. After the recognition processing, the recognition result is displayed in a pop-up window as denoted by 304. When the recognition result is proper, the operator inputs a confirmation instruction. Subsequently, the recognition result is inputted into a search engine connected to the network. Then, the mobile device receives the obtained search results, and displays the results as shown in the diagram denoted by 305. Thereafter, the operator sees the displayed search results, and selects the icons on the display to receive other contents.

Figure 4:
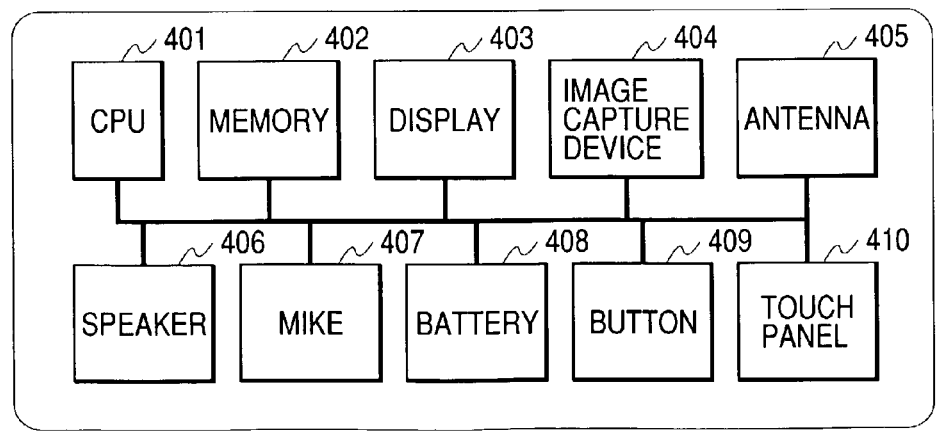
FIG. 4 is a diagram showing the hardware configuration of the mobile device of the present invention.

FIG. 4 shows the hardware configuration of the mobile device. The mobile device includes a CPU (401)for performing the control, image processing, and character recognition, a memory (402), a display (403), an image capture device (404) for capturing the input data, an antenna (405) for radio communication, a speaker (406), a microphone (407), a battery (408), buttons (409), and a touch panel (410) incorporated therein so as to be overlaid on the display being connected via a bus.

Figure 5:
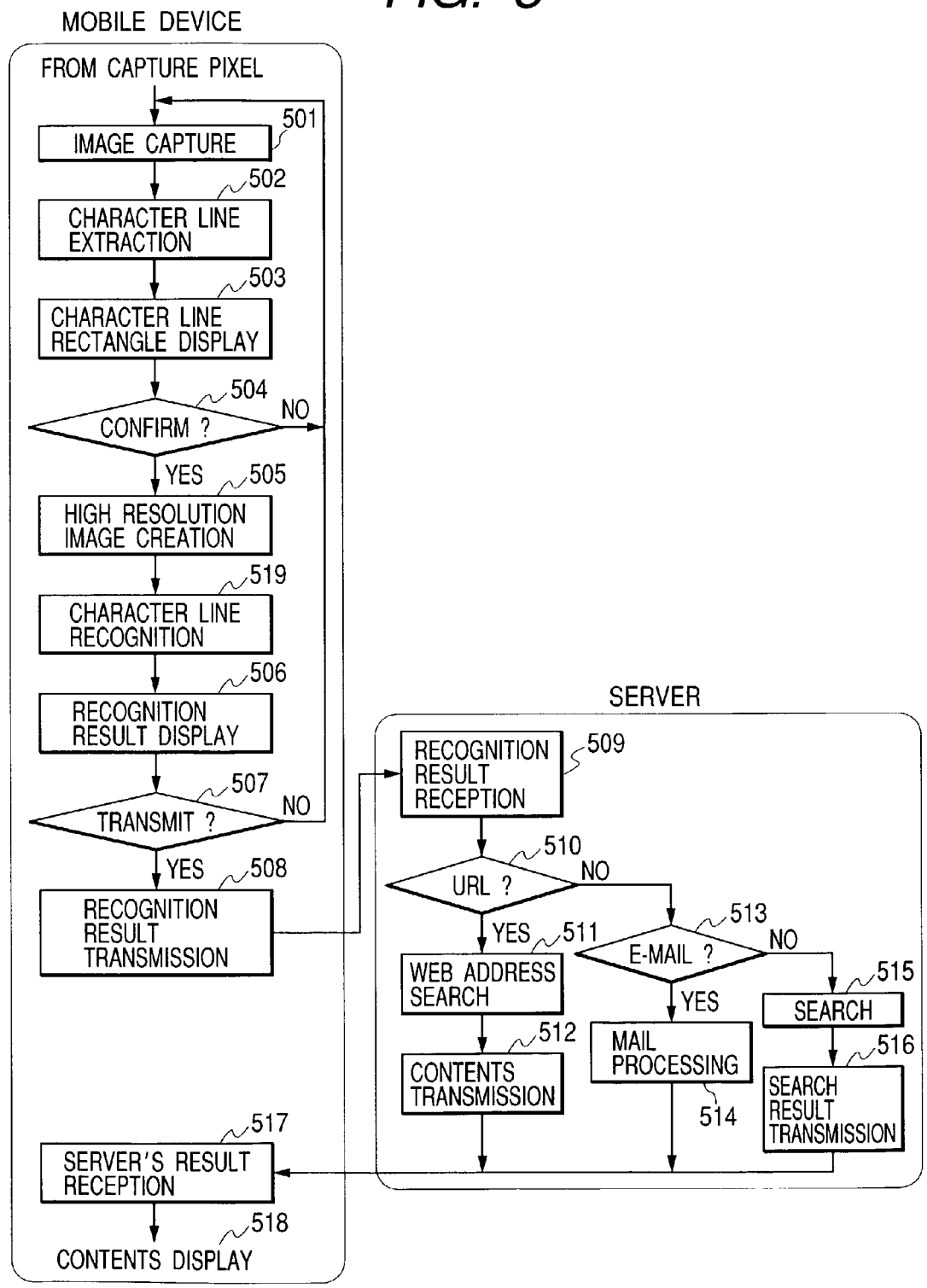
FIG. 5 is a flow chart showing the processing flow within the mobile device and a computer on a network of the present invention.

FIG. 5 shows the overall processing flow of the present invention. First, in a mobile device, the image of a target object is captured by a CCD using an image capture device in a step 501. The captured image is displayed in a display in the step 501. Subsequently, as shown in FIGS. 2 and 3, a character line extraction processing is performed by using the characters closest to the marker as a core in a step 502. The extraction result thus obtained is displayed in a rectangle strip in a superposed manner on the contents in the display in a step 503. Thus, the process returns to the image capture step 501 and repeated thereafter until the operator inputs a confirmation instruction in a step 504.

After the operator has input the confirmation instruction, the image processing is performed by using the local image within the displayed rectangle strip, and the processed data is inputted for recognition processing. A resolution enhancing processing is performed on the low resolution input image captured from the image capture device through a step 505. The local image with an enhanced resolution is inputted for character line recognition in a step 519. Subsequently, the operator is presented with the character recognition result, and asked for the instruction in a step 507. When the operator judges the result to be proper, the operator inputs a confirmation instruction. The confirmed data is transmitted to a computer connected to a network through wireless communication. If the operator determines that it is not a proper recognition result, the process goes back to the step 501 to process another image captured by the image capture device and to repeat the subsequent processing steps.

The character line transmitted to the computer is received by a computer or a server in a step 509. Whether the character line is a URL address or other character line is distinguished in a step 510. If the character line is the URL address, the webpage contents of the URL address are linked via the Internet in a step 511, and transmitted to the mobile device in a step 512. Otherwise, in a step 513, whether the character line is an E-mail address or not is distinguished. If it is the E-mail address, a mail processing program in which the address has been inserted in the address field is transmitted to the device in a step 512. The mail processing program can be implemented by using an application written by Java or the like. Further, the program for mail processing is stored in the mobile device so as to be used again. Whereas, when the character line is neither a URL address nor an E-mail address, in a step 515, it is inputted into a content search engine connected to the Internet to search with the character line as a keyword. In a step 516, the search result is transmitted to the device and presented to the operator.

On the mobile device side, in a step 517, the contents are received, and in a step 518, the operator views the contents to select the desired contents to perform mail processing or the like by selecting appropriate icons.

In addition to the foregoing data transmission processing sharing between the mobile device and the computers via the network, other alternatives are conceivable. For example, the target character line embedded area is selected on the mobile device, and then the local image (rather than the recognition results) is transmitted to a computer on the network. Then, the image processing and the character recognition are performed by the computer. There are conceivable transmission means for attaching the local image to a mail and transmitting it. Based on a plurality of candidates obtained as a result of the character recognition processing, the contents on the network are searched according to the order of the candidates. When the search is performed by using a plurality of candidates, and proper contents are found, the contents are transmitted to the mobile device, and displayed thereon. If proper contents have not been found via searches based on all the candidates, parameters are changed to repeat the character recognition processing.

By using the foregoing processing, the operator can view the desired contents only after inputting the character line embedded area confirmation instruction. However, even if the character recognition result has been false, different contents from those intended by the operator is displayed if there exist any corresponding contents.

Further, a service charge upon transmission and reception between the mobile device and the computers may be imposed. With such a service charge, a company managing the computers connected to the network charges the operator for the service upon reception of the character string (the recognition result), or upon the local image serving as an object to be recognized from the mobile device, or upon transmission of the contents to the mobile device side. The operator can receive the contents after confirming the recognition result of the character string. As a result, a stable service is ensured.

FIG. 6 shows a conceptual diagram of the character line extraction processing. First, a reference numeral 601 denotes the image captured by a camera of the mobile device, and 602 is an object on which the target character line is described. A sign denoted by a reference numeral 603 at the center of the display is a marker. A processing for extracting the character line located closest to the marker is carried out. The on-screen position of the marker can be shifted through the touch panel or button clicked by the operator. Then, the input image is binarized, and then connected components which are the mass of black pixels, are created. A reference numeral 604 denotes the image displaying the circumscribing rectangle outlines of the respective connected components. The character line extraction processing is carried out by using the circumscribing rectangle positional information of the connected components to speed up the processing. Then, one of the circumscribing rectangle outlines of the connected components closest to the marker is selected and indicated with a thick rectangle outline as denoted by 605. The connected component is used as a "core" in the initial state of the character line extraction. The connected components serving as the "core" is not displayed for the operator. A reference numeral 606 denotes the progress of the character line extraction. A character line rectangle strip is formed by incorporating neighboring connected components outwards from the core denoted by 605. Then, 607 denotes the character line rectangle composed of connected components as a result of the outward incorporating. A reference numeral 608 denotes the display of the character line rectangle extraction result as seen by the operator. The dotted line rectangle strip is the character line extraction result. When the operator sees the rectangle strip, and the rectangle strip properly encloses the target character line then, the operator inputs a confirmation instruction through a button. The character line result rectangle strip is varied whenever necessary by moving the device, or shifting the maker.

FIG. 7 shows the processing flow of the character line extraction processing. The character line extraction processing is accomplished in the following manner. First, an image is captured by an image capture device in a step 701. The input image is binarized at a step 702, and then, noise removal is performed in a step 703. Subsequently, in a step 704, the connected components are created from the binary image, and, in a step 705, the connected component closest to the marker is selected as the "core" of the initial value. Then, in a step 706, the connected components within a given short range from the connected component serving as the "core" are incorporated to form a character line rectangle strip. Then, the character line position is outputted. The rectangle strip is dynamically displayed in the display in a step 707. The process goes back to the image capture step 701, to repeat the subsequent processing steps, until the user inputs a confirmation instruction in a step 708. When the user has input the confirmation instruction, the character line position is proceeded for high resolution character line extraction processing.

Figure 8:
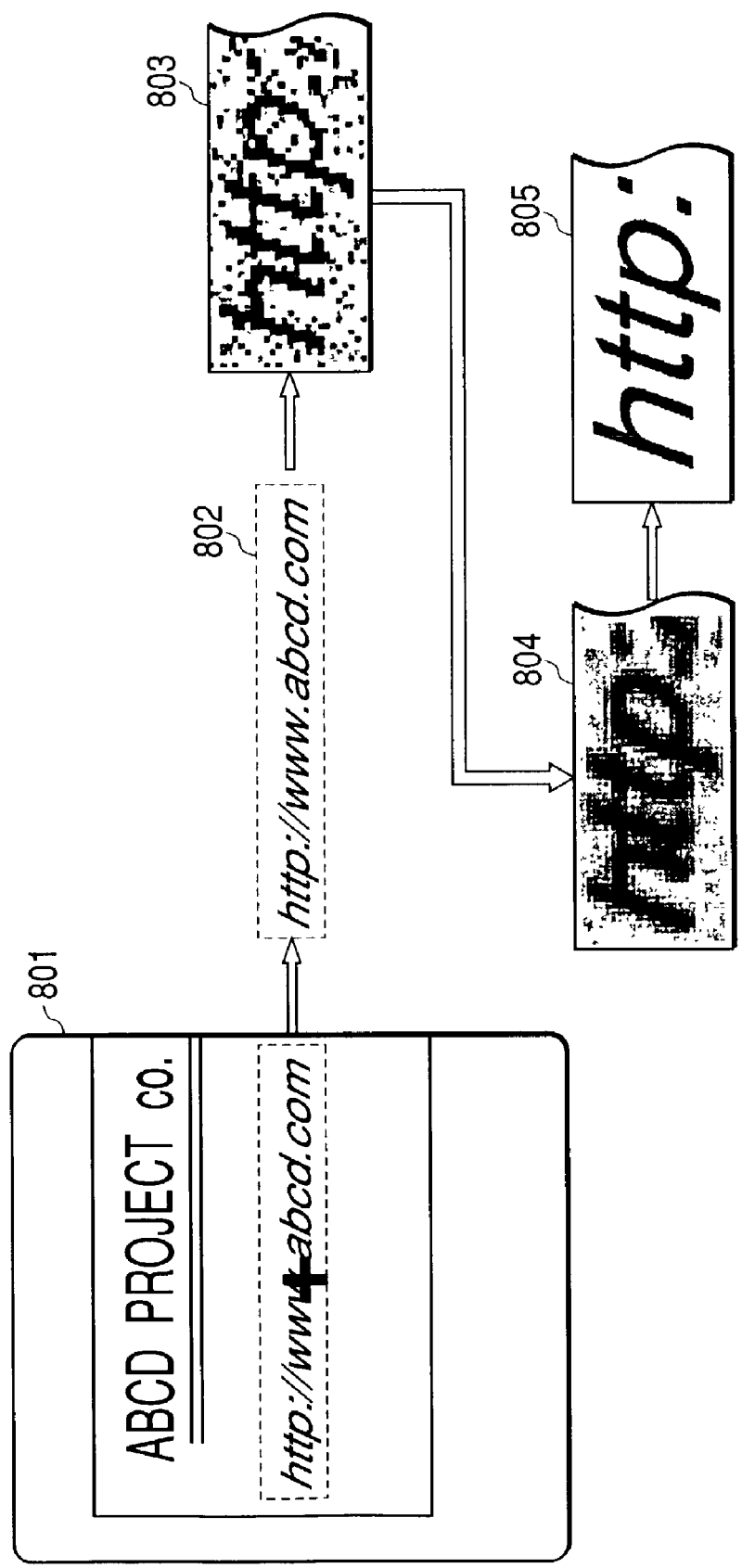
FIG. 8 is a conceptual diagram of high resolution image creation.

FIG. 8 shows a conceptual diagram of the high resolution image creation. Prior to inputting the character line image for recognition processing, the local image serving as an object is subjected to pixel complementing to create a high resolution local image to improve the recognition ratio. A reference numeral 801 denotes the display at the time when the operator has input a confirmation instruction on the character line rectangle strip. A reference numeral 802 denotes the image obtained by clipping the local image from the image obtained upon image capturing based on the character line rectangle positional information. The local image is subjected to a pixel complementing processing for higher resolution which results in an image denoted by a reference numeral 803. When the enhancement in resolution is accomplished by pixel complementing in this manner, each oblique line segment occurs in stepped configuration. Under such circumstances, smoothing is performed on the image. As a result, as shown in the diagram denoted by 804, the noise is reduced, so that the configuration of the oblique line segment also becomes smooth. Then, a binarization processing is performed to create a high resolution character pattern image with no noise. A distinct configuration as shown in the diagram denoted by 805. By inputting the high resolution line image for recognition processing, it is possible to obtain a high resolution recognition result even by using a low resolution capture device.

FIG. 9 shows the processing flow of the high resolution image creation. First, a local image is clipped from the image obtained upon the image capture in a step 901 based on the character line position determined in the character line extraction processing. The local image is subjected to image expansion by pixel complementing in a step 902. Then, the expanded image is subjected to smoothing in a step 903, followed by binarization in a step 904. As a result, a high resolution binary image is created.

Figure 10:
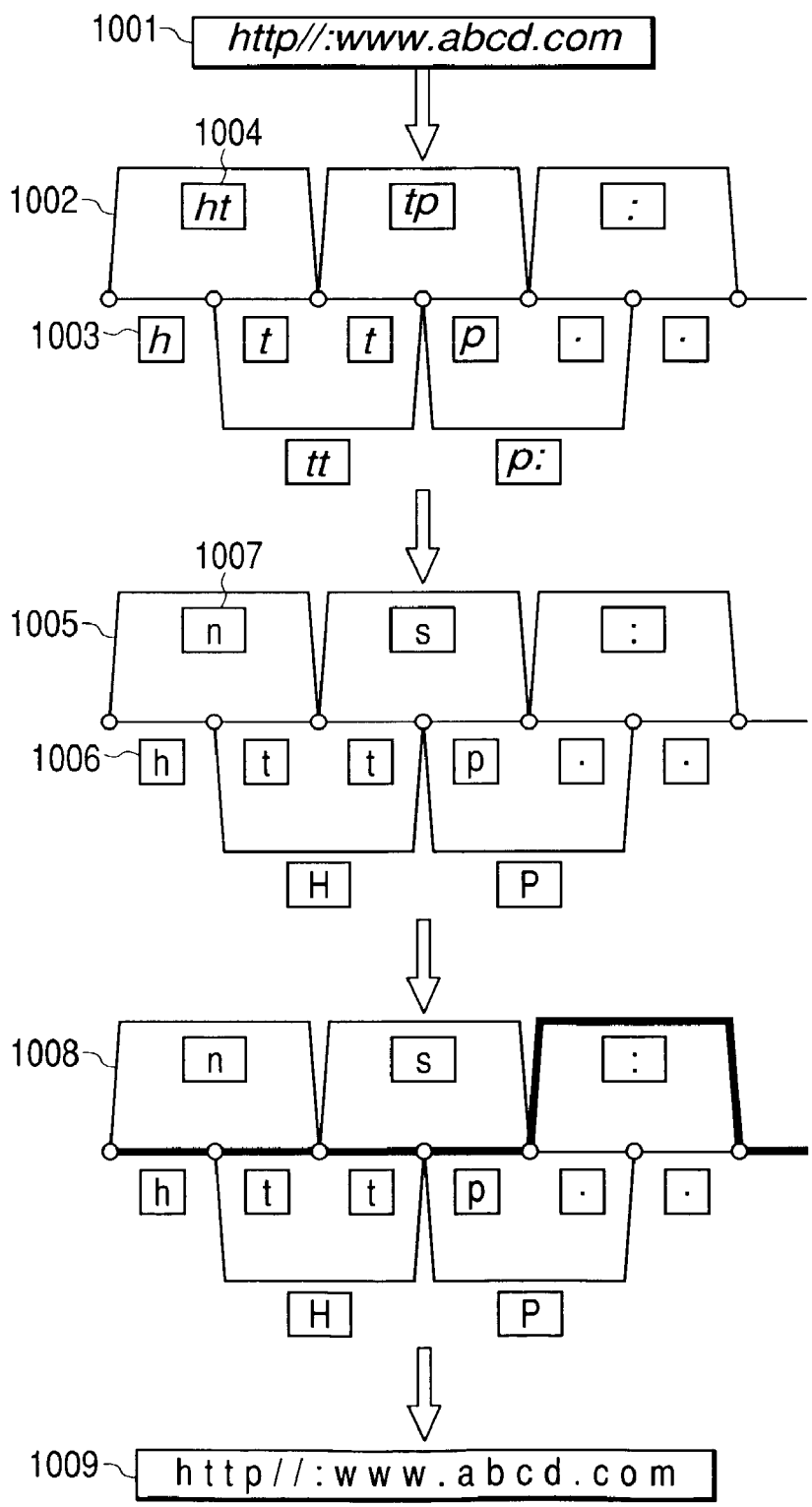
FIG. 10 is a conceptual diagram of character line recognition.

FIG. 10 shows a conceptual diagram of the character line recognition processing. A reference numeral 1001 denotes a character line image which has been inputted. A reference numeral 1002 denotes the combinations of character pattern candidates created for every connected component with respect to the character line image, and expressed in a segmentation hypothesis graph. A reference numeral 1003 denotes the pattern obtained by cutting only "h", and 1004 denotes the pattern obtained by combining "ht". By selecting the proper character patterns out of these combinations, and performing route search on a network, it is possible to obtain the recognition result of the character line. The result obtained by inputting the pattern on the network into a character recognition module is denoted by a reference numeral 1005. It is indicated as follows: as denoted by 1006, the recognition result of "h" is obtained for the pattern 1003 of "h"; whereas, as denoted by 1007, the recognition result for the pattern of a combination of the two characters "ht" is "n" (i.e., "ht" is recognized as "n"). In this manner, the degree of similarity between the character recognition result for every pattern and the template used for character recognition is recorded on the network depicted in the segmentation hypothesis graph. A reference numeral 1008 denotes the result obtained by performing a route search based on the degree of similarity between the word database and the recognition result through the network in which the record of each recognition processing has been collected. In this example, the route for the word (http, ://, www. co.jp, com, or the like) which frequently occurs as URL is screened/narrowed based on the word database. Each route for other words is determined by using the degree of similarity of the recognition result as an index. For acquiring the word database, the following means is conceived: the URL addresses are obtained from DNSs (domain name servers), or the existing words are screened/narrowed by using the geographical positional information when a signboard or the like is used as an object. The character line obtained by stringing together the characters on the determined route is denoted by a reference numeral 1009, which is the recognition result for the character line image.

Figure 11:
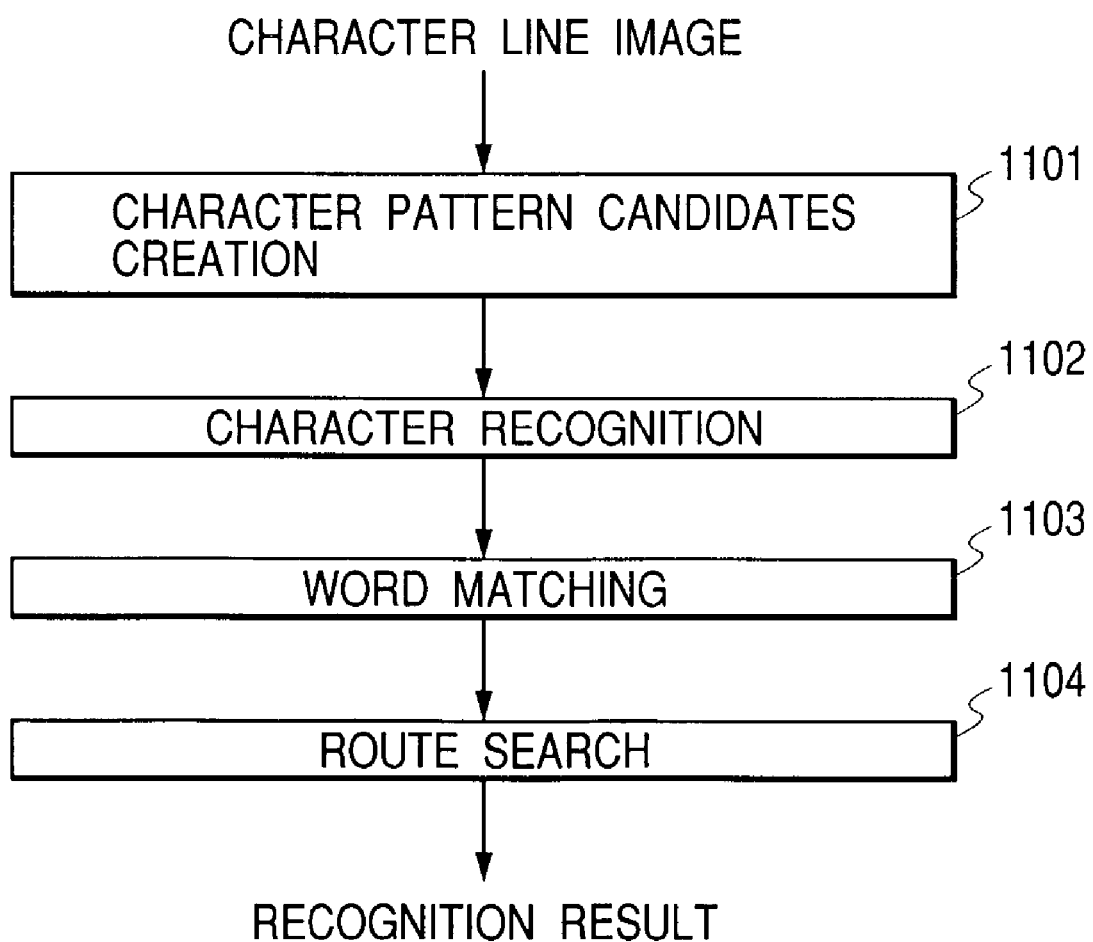
FIG. 11 is a flow chart of character line recognition.

FIG. 11 shows the processing flow of character line recognition. First, combinations serving as character pattern candidates are created for the input character line image to construct the network in a step 1101. Then, in a step 1102, the respective character pattern candidates are subjected to character recognition, and their respective corresponding recognition results and degrees of similarity are complied. Subsequently, route restriction on the network is performed by using previously stored word database in a step 1103. Then, the optimum route on the network is determined by utilizing word database restriction and the degree of similarity of the character recognition result. In consequence, the character line recognition result is obtained.

Figure 12:
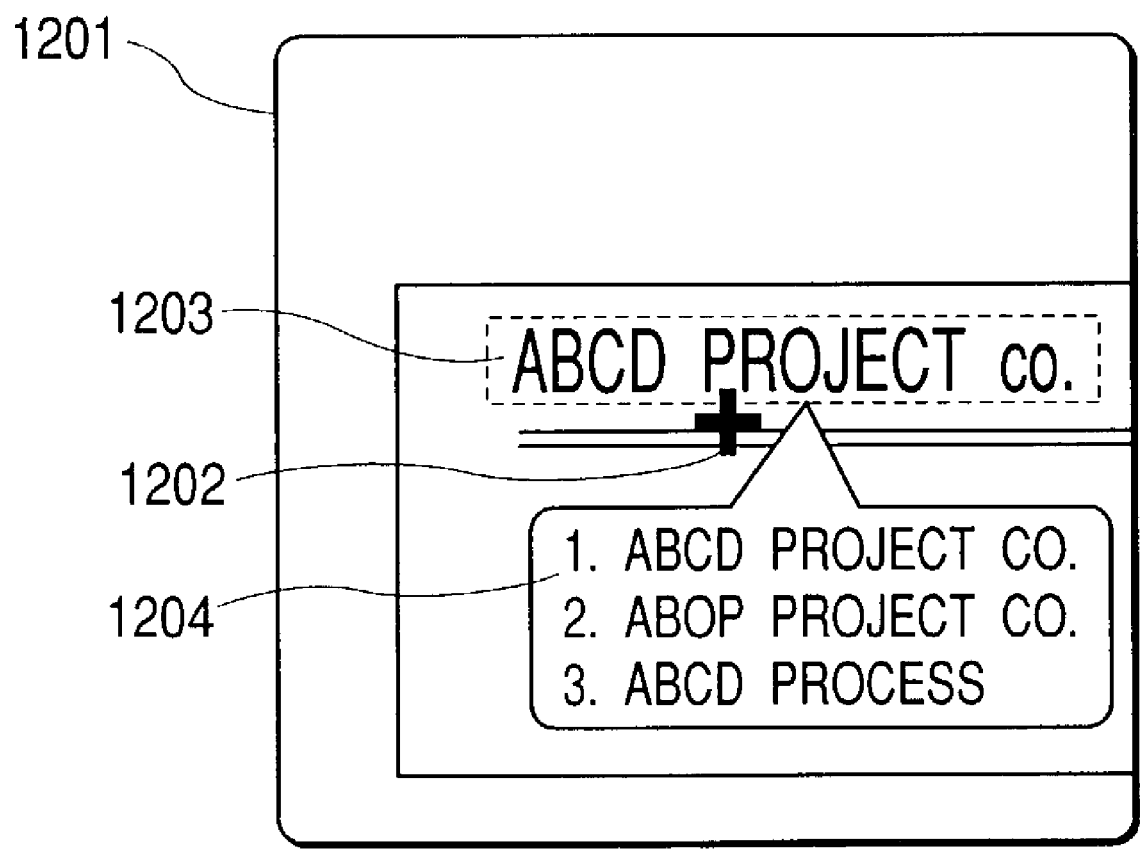
FIG. 12. shows an example of displaying two or more character sequence recognition results.

FIG. 12 shows an example of a display of two or more character sequence recognition results. 1201 is the display screen of a mobile device, and 1202 is a marker. When a rectangle outlines a character line such as 1203 "ABCD PROJECT co." to perform recognition operation, character sequence recognition processing is performed to the character line outlined by the rectangle. Whenever ambiguity arises in the recognition operation, two or more recognition result candidates are shown in the pop-up box 1204. In FIG. 12, the number of recognition result candidates is three and a correct answer is a candidate 1, an operator may choose the candidate 1 by clicking on the candidate 1 or inputting number "1". Alternatively, the user can simply touch the touch panel with a finger or a pointing object. Consequently, the correct recognition result is chosen, then transmitted to a PC via a network. Thereafter, processing is performed according to the chosen character sequence.

By using the foregoing means, it becomes possible to select the character line confirmed by the operator, and obtain the information contents from the character recognition result.

In accordance with the present invention, it becomes possible to photograph an object on which a given character line is described, and obtain the information based on the character line by using a mobile device with a built-in image capture device. Further, it is possible to facilitate the operation of the mobile device when an operator selects a given character line. Still further, even when a low resolution image capture device is used, it becomes possible to enhance the recognition ratio by creating a high resolution image in a pseudo manner, and performing a character recognition processing.

The principles, preferred embodiments and modes of operation of the present invention have been embedded in the foregoing specification. However, the invention which is intended to be protected is not limited to the particular embodiments disclosed. The embodiments described herein are illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A mobile device comprising:
    a means for capturing images continually;
    a means for displaying said captured images and a marker therein;
    a means for automatically and continuously extracting a character line embedded area displayed nearest to said marker in the captured images that are continually renewed and causing said display means to display said extracted character line embedded area with emphasis;
    a means for receiving a confirming signal input by a user thereby confirming the character line embedded area displayed nearest to said marker in one of the captured images, which are automatically and continuously extracted by the extracting means and displayed with emphasis, as to be processed for recognition;
    a means for recognizing a character line embedded in the confirmed character line embedded area;
    a means for transmitting the recognition result via a network; and
    a means for receiving feedback via the network based on the recognition result,
    wherein
    the displaying means displays the marker and the extracted character line embedded area with emphasis, and renews the displayed extracted character line embedded area with emphasis accordingly until the confirming signal is input to the confirming means.

2. The mobile device according to claim 1, wherein
    the extracting means detects patterns in the captured image, and
    one of the patterns closest to the marker is used as a core for incorporating the neighboring patterns thereby extracting the character line embedded area.

3. The mobile device according to claim 1, wherein the marker is movable.

4. The mobile device according to claim 1, further comprising:
    a means for presenting a plurality of recognition candidates recognized by the character line recognition means; and
    a means for selecting one of recognition candidates.

5. The mobile device according to claim 1, further comprising a resolution enhancing means, said resolution enhancing means subjects the confirmed character line embedded area to pixel complementing, smoothing, and binarizing.

6. The mobile device according to claim 2, wherein each of the patterns is a rectangle outline circumscribing one connected component in the captured image.

7. An image processing and transmission system comprising a mobile device, and a computer connected to the mobile device via a network,
the mobile device, comprising:
a means for capturing images;
a means for displaying said captured images and a marker therein;
a means for automatically and continuously extracting a character line embedded area displayed nearest to said marker in the captured images that are continually renewed and causing said display means to display said extracted character line embedded area with emphasis;
a means for receiving a confirming signal input by a user thereby confirming the character line embedded area displayed nearest to said marker in one of the captured images, which are automatically and continuously extracted by the extracting means and displayed with emphasis, as to be processed for recognition by the computer;
a means for transmitting the confirmed character line embedded area via a network to the computer; and
a means for receiving feedback from the computer via the network based on the recognition result,
wherein the computer comprises a means for searching information through the network based on a character line embedded in the confirmed character line embedded area, and for transmitting the search result to the mobile device; and a means for recognizing the character line embedded in the confirmed character line embedded area, and
the displaying means displays the marker and the extracted character line embedded area with emphasis, and renews the displayed extracted character line embedded area with emphasis accordingly until the confirming signal is input to the confirming means.

8. The image processing and transmission system according to claim 7, wherein the computer further comprises:
a means for distinguishing the recognition result is a URL address, a mail address, or one other character string,
a means for transmitting contents linked by the URL address to the mobile device if the distinguished result is the URL address;
a means for transmitting a program for processing a mail to the mobile device if the distinguished result is the mail address, and
a means for starting a search program to search information in the network based on said other character string if the distinguished result is said other character strings, and for transmitting the search result to the mobile device.

9. The image processing and transmission system according to claim 7, further comprising a means for charging a fee when the mobile device receives the search result transmitted from the computer.

10. The mobile device according to claim 1, wherein the displaying means selectively displays an image captured by a remote camera and transmitted to the mobile device via the network,
the displaying means displays the transmitted image;
the extracting means extracts a character line embedded area in the transmitted image, and
the extracting means continuing extracting character line embedded areas from changing transmitted images, and the displaying means displays the extracted character line embedded area accordingly until a confirming signal is input to the confirming means.

11. The image processing and transmission system according to claim 7, wherein the displaying means selectively displays an image captured by a remote camera and transmitted to the mobile device via the network,
the displaying means displays the transmitted image;
the extracting means extracts a character line embedded area in the transmitted image, and
the extracting means continuing extracting character line embedded areas from changing transmitted images, and the displaying means displays the extracted character line embedded area accordingly until a confirming signal is input to the confirming means.

12. The image processing and transmission system according to claim 7, wherein the mobile device
the display means shows a marker,
the extracting means detects patterns in the captured image, and
one of the patterns closest to the marker is used as a core for incorporating the neighboring patterns thereby extracting the character line embedded area.

13. The image processing and transmission system according to claim 12, wherein the marker is movable.

14. The image processing and transmission system according to claim 7, wherein the mobile device further comprising:
a means for presenting a plurality of recognition candidates recognized by the character line recognition means; and
a means for selecting one of recognition candidates.

15. The image processing and transmission system according to claim 7, wherein the mobile device further comprising a resolution enhancing means, said resolution enhancing means subjects the confirmed character line embedded area to pixel complementing, smoothing, and binarizing.

16. The image processing and transmission system according to claim 12, wherein each of the patterns is a rectangle outline circumscribing one connected component in the captured image.

17. A mobile device comprising:
a means for capturing images continually;
a means for displaying said captured images and a marker therein;
a means for automatically and continuously extracting a character line embedded area displayed nearest to said marker in the captured images that are continually renewed and causing said display means to display said extracted character line embedded area with emphasis;
a means for receiving a confirming signal input by a user thereby confirming the character line embedded area displayed nearest to said marker in one of the captured images, which are automatically and continuously extracted by the extracting means and displayed with emphasis, as to be processed for recognition;
a resolution enhancing means for subjecting the confirmed character line embedded area to pixel complementing, smoothing, and binarizing; and
a means for recognizing a character line embedded in the resolution-enhanced character line embedded area,
wherein
the displaying means displays the marker and the extracted character line embedded area with emphasis, and renews the displayed extracted character line embedded area with emphasis accordingly until the confirming signal is input to the confirming means.

18. The mobile device according to claim 17, wherein the extracting means detects patterns in the captured image, and one of the patterns closest to the marker is used as a core for incorporating the neighboring patterns thereby extracting the character line embedded area.

19. The mobile device according to claim 17, wherein the marker is movable.

20. The mobile device according to claim 18, wherein each of the patterns is a rectangle outline circumscribing one connected component in the captured image.

* * * * *